No. 61,451.
PATENTED JAN. 22, 1867.
J. A. PEASE.
HAT BODY.
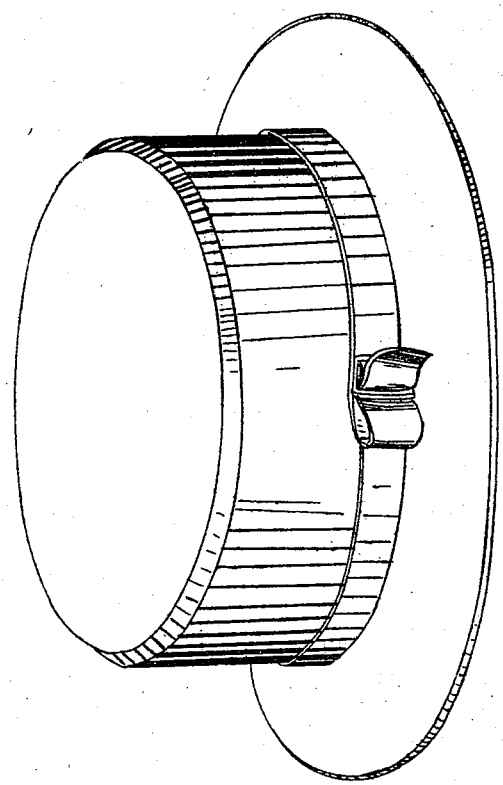
Attest
*[signature]*
*[signature]*
Inventor
*Julius A. Pease*

United States Patent Office.

JULIUS A. PEASE, OF NEW YORK, N. Y.

Letters Patent No. 61,451, dated January 22, 1867.

IMPROVEMENT IN HAT BODIES.

The Schedule referred to in these Letters Patent and making part of the same.

TO ALL WHOM IT MAY CONCERN:

Be it known that I, JULIUS A. PEASE, of the city, county, and State of New York, have invented a new and improved Hat, made from raw or untanned hide; and I do hereby declare that the following is a full and exact description thereof, reference being had to the accompanying drawings, and to the letters of reference marked thereon The nature of my invention consists in making hats or hat bodies from raw hide or untanned skin.

To enable others skilled in the art to make and use my invention, I will proceed to describe its construction and operation.

I take the raw or untanned sheep skin or other skin and split it in the usual manner, by machine. I now take the skin and stretch it over a block or former of any desired shape. I have a ring which I press around the body of the hat at the intersection of the rim. It is then allowed to dry, if it is intended for a hat body to be covered with plush or other material; or I place the hat on the block in a liquor for tanning, and partially or wholly tan it. It can be colored to resemble felt or cloth. By the use of the raw hide I can form a hat or hat body for what are called silk hats, the nature of the raw hide allowing it to be stretched into almost any shape. The advantages to be obtained by the use of raw hide are, first, it can be formed into almost any shape, and when dry will retain its form; secondly, the cheapness with which a hat body can be made, and the lightness of it, it not weighing more than one-half of those now in use, made from wool, &c.

I know that hats have been made from leather, which allow but of a certain depth of body, &c. I do not claim that; but make my claim upon making hats for gentlemen or ladies, or a head covering analogous to a hat, from raw hide.

What I claim as my invention, and desire to secure by Letters Patent, is—

A hat or hat body, made from raw hide or untanned hide, substantially as before described.

JULIUS A. PEASE.

Witnesses:
　J. B. NONES,
　EDWARD WHEELRIGHT.